(12) United States Patent
Kagaya (10) Patent No.: US 10,239,356 B2
(45) Date of Patent: Mar. 26, 2019

(54) PNEUMATIC TIRE

(71) Applicant: The Yokohama Rubber Co., LTD., Minato-ku, Tokyo (JP)

(72) Inventor: Keisuke Kagaya, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 584 days.

(21) Appl. No.: 14/785,033

(22) PCT Filed: Apr. 1, 2014

(86) PCT No.: PCT/JP2014/059640
§ 371 (c)(1),
(2) Date: Oct. 16, 2015

(87) PCT Pub. No.: WO2014/171327
PCT Pub. Date: Oct. 23, 2014

(65) Prior Publication Data
US 2016/0089937 A1    Mar. 31, 2016

(30) Foreign Application Priority Data

Apr. 17, 2013    (JP) .................. 2013-086724

(51) Int. Cl.
*B60C 11/11*    (2006.01)
*B60C 11/12*    (2006.01)
(Continued)

(52) U.S. Cl.
CPC ...... *B60C 11/0327* (2013.01); *B60C 11/0304* (2013.01); *B60C 11/0306* (2013.01);
(Continued)

(58) Field of Classification Search
CPC ............ B60C 11/0304; B60C 11/0306; B60C 11/04; B60C 11/11; B60C 11/1236;
(Continued)

(56) References Cited

U.S. PATENT DOCUMENTS 4,785,861 A * 11/1988 Fujiwara ................. B60C 3/04
152/209.14
5,204,036 A *  4/1993 MacMillan ........ B29D 30/0606
156/95
(Continued)

FOREIGN PATENT DOCUMENTS

CN    102673318    9/2012
EP    2 546 076    1/2013
(Continued)

OTHER PUBLICATIONS

Machine translation for Japan 08-318710 (Year: 2018).*
(Continued)

*Primary Examiner* — Steven D Maki
(74) *Attorney, Agent, or Firm* — Thorpe North & Western (57) ABSTRACT

A pneumatic tire is provided with improved braking performance and turning performance on ice. Circumferential narrow grooves are disposed at a density in the tire width direction of not less than 0.06 grooves/mm and not more than 0.2 grooves/mm. Width direction narrow grooves extend at an angle with respect to the tire width direction of not less than −45° and not more than +45°. The circumferential narrow grooves have at least one bent portion. The bend angle of the bent portion is not less than 40° and not more than 160°.

19 Claims, 6 Drawing Sheets

(51) Int. Cl.
*B60C 11/03* (2006.01)
*B60C 11/04* (2006.01)

(52) U.S. Cl.
CPC .......... *B60C 11/11* (2013.01); *B60C 11/1236* (2013.01); *B60C 11/04* (2013.01); *B60C 2011/036* (2013.01); *B60C 2011/0346* (2013.01); *B60C 2011/0348* (2013.01); *B60C 2011/0353* (2013.01); *B60C 2011/1209* (2013.01); *B60C 2011/1213* (2013.01); *B60C 2011/1245* (2013.01); *B60C 2011/1295* (2013.01)

(58) Field of Classification Search
CPC ....... B60C 2011/0348; B60C 2011/036; B60C 2011/0346; B60C 2011/1209; B60C 2011/1213; B60C 2011/1245; B60C 2011/1295
See application file for complete search history.

(56) References Cited

U.S. PATENT DOCUMENTS

| | | | |
|---|---|---|---|
| 2003/0019555 | A1 | 1/2003 | Nakagawa |
| 2011/0162768 | A1 | 7/2011 | Ochi |
| 2012/0037289 | A1* | 2/2012 | Ochi .................. B60C 11/11 152/209.18 |
| 2012/0125501 | A1* | 5/2012 | Ochi .................. B60C 11/11 152/209.18 |
| 2012/0227881 | A1 | 9/2012 | Kudo |
| 2012/0325385 | A1 | 12/2012 | Ochi |

FOREIGN PATENT DOCUMENTS

| | | | |
|---|---|---|---|
| GB | 520231 | | 4/1940 |
| GB | 520231 A | * | 4/1940 |
| JP | 03-090404 A | * | 4/1991 |
| JP | 61-009315 A | * | 1/1996 |
| JP | 08-318710 A | * | 3/1996 |
| JP | 2003-011618 | | 1/2003 |
| JP | 2003-226116 | | 8/2003 |
| JP | 2003/226116 | | 8/2003 |
| JP | 2006-051873 | | 2/2006 |
| JP | 2006-151235 | | 6/2006 |
| JP | 2006-312383 | | 11/2006 |
| JP | 2007-153104 | | 6/2007 |
| JP | 2007-204007 | | 8/2007 |
| JP | 2008-162298 | | 7/2008 |
| JP | 2011/183925 | | 9/2011 |
| WO | WO 2010/032606 | | 3/2010 |
| WO | WO 2011/111319 | | 9/2011 |
| WO | WO 2011/111353 | | 9/2011 |

OTHER PUBLICATIONS

Machine translation for Japan 03-090404 (Year: 2018).*
Machine translation for Japan 61-009315 (Year: 2018).*
International Search Report for International Application No. PCT/JP2014/059640 dated Jun. 24, 2014, 2 pages.

* cited by examiner

PNEUMATIC TIRE

TECHNICAL FIELD

The present technology relates to a pneumatic tire with improved braking performance and turning performance on ice.

BACKGROUND

Conventionally, technology for improving the performance on ice (braking performance and turning performance) of studless tires is known (for example, see International Patent Publication No. WO/2010/032606 and Japanese Unexamined Patent Application Publication No. 2008-162298A). The pneumatic tires disclosed in International Patent Publication No. WO/2010/032606 and Japanese Unexamined Patent Application Publication No. 2008-162298A each have tread patterns with a plurality of blocks arranged densely in a honeycomb-shape.

Normally, when the resistance to an external force is increased in a specific direction only by making the shape of the blocks anisotropic, a specific performance of the tire performance tends to be improved. For example, if the resistance to an external force in the tire circumferential direction is increased compared with the resistance to an external force in the other directions, the braking performance on ice is improved. Also, if the resistance to an external force in the tire width direction is increased compared with the resistance to an external force in the other directions, the turning performance on ice is improved.

In the pneumatic tire disclosed in International Patent Publication No. WO/2010/032606, there is no anisotropy in the shape of each of the blocks in either the tire circumferential direction or the tire width direction. Also, in the pneumatic tire disclosed in Japanese Unexamined Patent Application Publication No. 2008-162298A, no anisotropy can be seen in the design of groups of blocks formed from a plurality of blocks, when the tread pattern is viewed as a whole, although the shape of each block has anisotropy in the tire width direction.

Accordingly, in the technologies disclosed in International Patent Publication No. WO/2010/032606 and Japanese Unexamined Patent Application Publication No. 2008-162298A, at least when the tread pattern is viewed as a whole, there is no anisotropy in the design of groups of blocks, so it is not clear whether braking performance and turning performance can be exhibited at a high level.

SUMMARY

The present technology provides a pneumatic tire with the braking performance and turning performance on ice improved in particular.

The pneumatic tire according to the present technology is a pneumatic tire that includes a circumferential main groove, and rows of small blocks partitioned and formed by a plurality of width direction narrow grooves and a plurality of circumferential narrow grooves that intersect with the width direction narrow grooves. The circumferential narrow grooves are disposed at a density in the tire width direction of not less than 0.06 grooves/mm and not more than 0.2 grooves/mm. The width direction narrow grooves extend at an angle with respect to the tire width direction of not less than −45° and not more than +45°. The circumferential narrow grooves have at least one bent portion. The bend angle of the bent portion is not less than 40° and not more than 160°.

The pneumatic tire according to the present embodiment provides an improvement in the density in the tire width direction of the circumferential narrow grooves and the angle at which the tire width direction narrow grooves are disposed, and in addition assuming that bent portions are provided in the circumferential narrow grooves, provides an improvement in the bend angle of the bent portions. As a result, according to the pneumatic tire of the present embodiment, the braking performance and the turning performance on ice are improved in particular.

BRIEF DESCRIPTION OF THE DRAWING(S)

FIGS. 4A and 4B are plan views illustrating the relationship between small blocks B1 that are adjacent to each other in the tire width direction in the pneumatic tires illustrated in FIG. 1 or 3, FIG. 4A illustrates a case in which the small blocks do not have a region that is the same in the tire width direction, and FIG. 4B illustrates a case in which the small blocks have a region that is the same in the tire width direction.

DETAILED DESCRIPTION

The following is a detailed description of an embodiment of a pneumatic tire according to the present technology (hereinafter, referred to as the Basic Mode and Additional Modes 1 to 10), based on the drawings. Note that the present technology is not limited to these embodiments. Furthermore, the constituents of the embodiments include constituents that can be easily replaced by those skilled in the art, and constituents that are substantially the same. In addition, the various modes included in this embodiment can be combined as desired within the scope of obviousness by a person skilled in the art.

Basic Embodiment

A basic embodiment of the pneumatic tire according to the present technology will now be described. In the following description, "tire radial direction" refers to a direction orthogonal to the rotational axis of the pneumatic tire; "inner side in the tire radial direction" refers to a side that is near to the rotational axis in the tire radial direction; and "outer side in the tire radial direction" refers to a side that is far from the rotational axis in the tire radial direction. Furthermore, "tire circumferential direction" refers to a circumferential direction with the rotational axis as the center axis. Additionally, "tire width direction" refers to a direction parallel to the rotational axis; "inner side in the tire width direction" refers to a side that is near to a tire equatorial plane CL (tire equator line) in the tire width direction; and "outer side in the tire width direction" refers to a side that is far from the tire equatorial plane CL in the tire width direction. Note that "tire equatorial plane CL" refers to a plane that is orthogonal to the rotational axis of the pneumatic tire and that passes through the center of the tire width of the pneumatic tire.

(Basic Mode 1)

Figure 1:
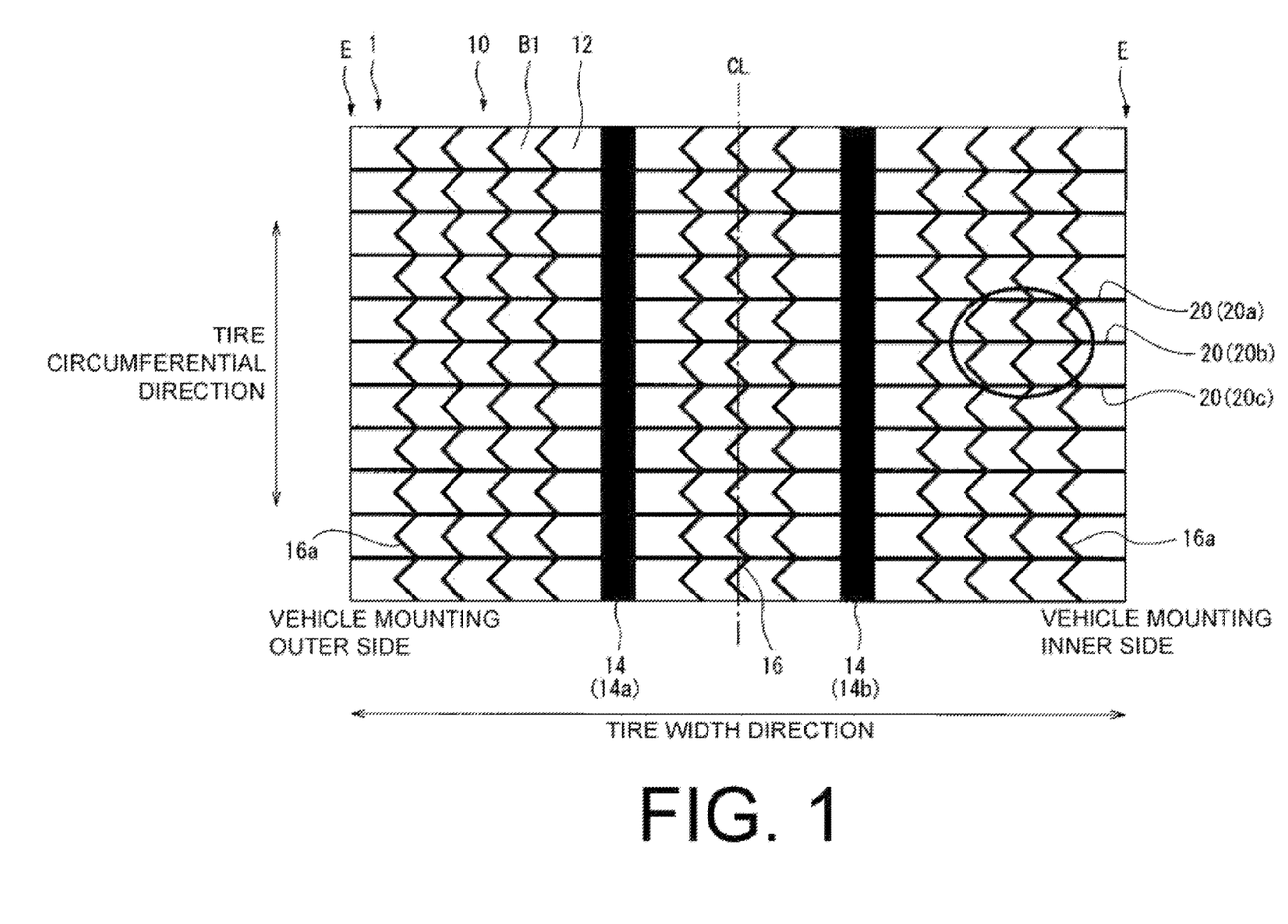
FIG. 1 is a plan view of a tread portion of a pneumatic tire according to an embodiment of the present technology.

Basic Mode 1 is a form of a pneumatic tire with a specified vehicle mounting direction. FIG. 1 is a plan view of a tread portion of a pneumatic tire according to an embodiment of the present technology. The tread portion 10 of the pneumatic tire 1 illustrated in this drawing is made from a rubber material (tread rubber) that is exposed on the outermost side in the tire radial direction of the pneumatic tire 1, and the surface thereof forms the profile of the pneumatic tire 1. The surface of the tread portion 10 forms a tread surface 12 constituting the surface that contacts the road surface when a vehicle (not illustrated) upon which the pneumatic tire 1 is mounted is traveling.

As illustrated in FIG. 1, grooves 14, 16 extending in the tire circumferential direction, and grooves 20 inclined with respect to the tire circumferential direction are provided on the tread surface 12, forming the tread pattern illustrated on this drawing. The specific configuration of the grooves 14 to 20 is as follows.

Namely, circumferential main grooves 14 (circumferential main groove 14a on the vehicle mounting outer side, circumferential main groove 14b on the vehicle mounting inner side) are provided on the tread surface 12. A plurality of circumferential narrow grooves 16 extending in the tire circumferential direction in a zigzag manner and that are narrower than the circumferential main grooves 14 is disposed on both sides in the tire width direction of the circumferential main grooves 14 (14a, 14b).

Also, a plurality of width direction narrow grooves 20 extending in the tire width direction and that are narrower than the circumferential main grooves 14 is disposed on the tread surface 12. The width direction narrow grooves 20 (for example, width direction narrow grooves 20a, 20b, 20c) are disposed at a fixed pitch in the tire circumferential direction.

As a result of the above, in the example illustrated in FIG. 1, rows of small blocks are formed in both the tire width direction and the tire circumferential direction by the plurality of circumferential narrow grooves 16 and the plurality of width direction narrow grooves 20 that intersect with these circumferential narrow grooves 16. Note that in the present embodiment, when there are circumferential thick grooves extending substantially in the tire circumferential direction that are wider than the circumferential narrow grooves 16 (the circumferential main grooves 14 in the case illustrated in FIG. 1), the land portions partitioned and formed between these circumferential thick grooves are considered to be ribs. Note that in the present embodiment, when there are also width direction thick grooves extending substantially in the tire width direction that are wider than the width direction narrow grooves 20 (none in the case of FIG. 1), the land portions partitioned and formed between the circumferential thick grooves and partitioned and formed between the width direction thick grooves are considered to be blocks.

Also, in the present embodiment, the groove width of the circumferential main grooves 14 (14a, 14b) can be 4.0 mm or more. Also, although not illustrated on the drawings, when sipes are formed on the tread surface 12 in the present embodiment, the groove width of the sipes can be less than 1.0 mm. Here, the groove width is the maximum dimension of the groove in a direction perpendicular to the direction in which the groove extends.

Under this assumption, in the present embodiment (Basic Mode 1), the circumferential narrow grooves 16 are disposed with a density in the tire width direction of not less than 0.06 grooves/mm, and not more than 0.2 grooves/mm. Here, the density in the tire width direction of the circumferential narrow grooves 16 means the number of circumferential narrow grooves 16 per unit length in the tire width direction, in the tire width direction region between the two ground contact edges E as illustrated in FIG. 1.

Also, in the present embodiment, the width direction narrow grooves 20 extend at an angle with respect to the tire width direction of not less than −45° and not more than +45°, and in the example illustrated in FIG. 1 the angle is 0°. Note that in the present embodiment, extension inclined upwards and to the right in the plane of the paper of FIG. 1 is taken to be a positive angle with respect to the tire width direction, and extension inclined downwards and to the right is taken to be a negative angle.

In addition, in the present embodiment, the circumferential narrow grooves 16 have at least one bent portion, and in the example illustrated in FIG. 1 have a plurality of bent portions. In other words, in the example illustrated in FIG. 1, one bent portion is formed in one circumferential narrow groove 16 between width direction narrow grooves 20.

Figure 2:
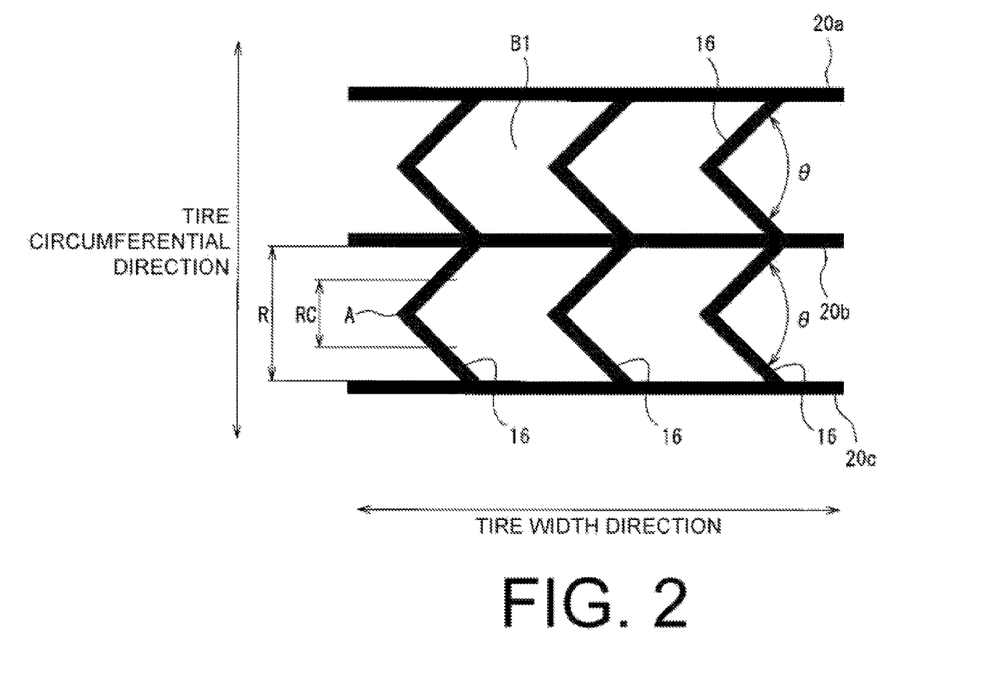
FIG. 2 is a magnified plan view of the part of the tread portion circled in FIG. 1.

FIG. 2 is a magnified plan view of the part of the tread portion circled in FIG. 1. In the present embodiment, as illustrated in FIG. 2, the bend angle θ of the bent portion is not less than 40° and not more than 160°. The bent portion is not limited to one configured from two straight lines between width direction narrow grooves 20a, 20b that are adjacent to each other in the tire circumferential direction and likewise between width direction narrow grooves 20b, 20c that are adjacent to each other in the tire circumferential direction, as illustrated in FIG. 2. Although not illustrated on the drawings, the bent portion may be one that extends in a curved shape between the grooves 20a, 20b (or between the grooves 20b, 20c). If the bent portion extends in a curved shape, the angle as described above is the angle formed between straight lines that are extended from both ends in the tire circumferential direction of the bent portion to the apex of the bent portion.

<Action>

Normally, many edges are formed in the land portions (blocks or ribs) by disposing a plurality of narrow grooves (or sipes) on the tread surface of studless tires. Also, as a result of the specific directional component that these edges have, the resistance with respect to external forces in a direction perpendicular to the specific direction is increased. For example, if an edge with a large tire circumferential direction component is formed in the small block B1 illustrated in FIG. 1, the resistance with respect to external forces in the tire width direction is increased by this edge. In the pneumatic tire according to the present embodiment, by providing the circumferential narrow grooves 16 that form such edges at a density in the tire width direction of not less than 0.06 grooves/mm, groups of small blocks formed from a plurality of small blocks B1 can be provided with many edges having a large tire circumferential direction component. As a result, the resistance with respect to external forces in the tire width direction is increased, and therefore the turning performance on ice can be improved.

In contrast, if an excessive number of circumferential narrow grooves 16 is disposed on the tread surface of the studless tire, the small blocks B1 will be easily able to collapse in the tire width direction, and the resistance with respect to external forces in the tire width direction will be reduced. However, in the pneumatic tire according to the present embodiment, by providing the circumferential narrow grooves 16 at a density in the tire width direction of not more than 0.2 grooves/mm, collapse of the small blocks B1 in the tire width direction is minimized, so sufficient resistance with respect to external forces in the tire width direction can be sufficiently ensured, and excellent turning performance on ice can be exhibited.

Note that by providing the circumferential narrow grooves 16 at a density in the tire width direction of not less than 0.08 grooves/mm and not more than 0.12 grooves/mm, each of the above effects can be exhibited at an even higher level.

Also, if an edge is formed with a large tire width direction component in the small blocks B1 illustrated in FIG. 1, the resistance with respect to external forces in the tire circumferential direction is increased by this edge. In the pneumatic tire according to the present embodiment, the angle of extension of the width direction narrow grooves 20 is an angle that includes a comparatively large tire width direction component of the edge of the small blocks B1 partitioned and formed by these grooves 20, and is not less than −45° and not more than +45° with respect to the tire width direction. As a result, the resistance with respect to external forces in the tire circumferential direction is increased, and therefore the braking performance on ice can be improved.

Note that by making the extension angle of the width direction narrow grooves 20 not less than −20° and not more than +20° with respect to the tire width direction, the above effects can be exhibited at an even higher level.

In addition, in the pneumatic tire according to the present embodiment, by providing at least one bent portion in the circumferential narrow grooves 16, anisotropy is provided in the shape of the small blocks B1 partitioned and formed by the circumferential narrow grooves 16, and in the example illustrated in FIG. 1 the anisotropy is provided with respect to the tire width direction. As a result, the resistance with respect to external forces in the tire width direction can be increased compared with the resistance with respect to external forces in other directions, and therefore the turning performance on ice can be improved.

In addition, in the pneumatic tire according to the present embodiment, by making the bend angle θ of the bent portion not less than 40°, sufficient edge component in the tire circumferential direction is provided on the edges of the small blocks B partitioned and formed by the circumferential narrow grooves 16. As a result, the resistance with respect to external forces in the tire width direction can be increased, and therefore the turning performance on ice can be improved.

Also, in the pneumatic tire according to the present embodiment, by making the bend angle θ of the bent portion not more than 160°, sufficient edge component in the tire width direction is provided on the edges of the small blocks B1 partitioned and formed by the circumferential narrow grooves 16. As a result, the resistance with respect to external forces in the tire circumferential direction can be increased, and therefore the braking performance on ice can be increased.

Note that by making the bend angle θ of the bent portion not less than 60° and not more than 140°, each of the above effects can be exhibited at an even higher level.

As described above, the pneumatic tire according to the present embodiment provides an improvement in the density in the tire width direction of the circumferential narrow grooves and the angle at which the tire width direction narrow grooves are disposed, and in addition assuming that bent portions are provided in the circumferential narrow grooves, provides an improvement in the bend angle of the bent portions. As a result, according to the pneumatic tire of the present embodiment, the braking performance and the turning performance on ice can be improved in particular.

Although it is not illustrated in the drawings, the pneumatic tire according to the present embodiment described above has a meridian cross-section form similar to that of a conventional pneumatic tire. Here, the meridian cross-section form of the pneumatic tire refers to the cross-sectional shape of the pneumatic tire as it appears on a plane normal to the tire equatorial plane CL. As seen in meridian cross-section, the pneumatic tire according to the present embodiment comprises bead portions, side wall portions, shoulder portions, and a tread portion from inside to outside in the radial direction of the tire. As seen, for example, in meridian cross-section, the pneumatic tire is provided with a carcass layer that extends from the tread portion to the bead portions on both sides and is wound around a pair of bead cores, and a belt layer and a belt reinforcing layer upon the carcass layers in that order outward in the radial direction of the tire.

The pneumatic tire according to the present embodiment can be obtained via ordinary manufacturing steps; i.e., a tire material mixing step, a tire material machining step, a green tire molding step, a vulcanization step, a post-vulcanization inspection step, etc. In particular, when manufacturing the pneumatic tire according to the present embodiment, recesses and protrusions corresponding to the tread pattern illustrated in FIG. 1 are formed on the inner wall of the vulcanization mold used to perform vulcanization.

(Basic Mode 2)

Figure 3:
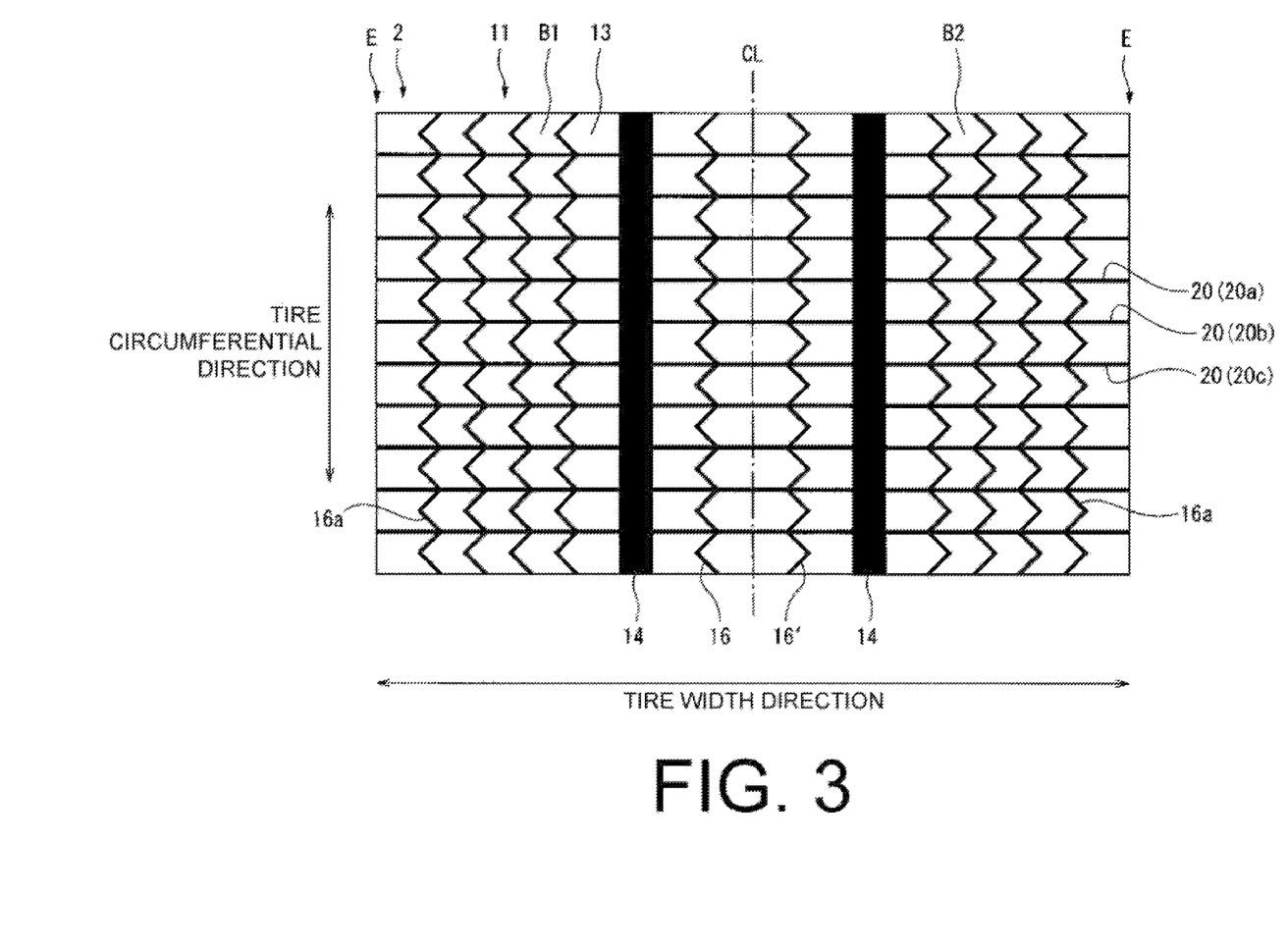
FIG. 3 is a plan view of a tread portion of a pneumatic tire according to an embodiment of the present technology.

Basic Mode 2 is a form of pneumatic tire without a specified vehicle mounting direction. FIG. 3 is a plan view of a tread portion of a pneumatic tire according to an embodiment of the present technology. The pneumatic tire 1 illustrated in this drawing has a tread pattern with line symmetry with respect to the tire equatorial plane CL. When the reference symbols indicated on this drawing are the same as the reference symbols indicated on FIG. 1, they indicate the same constituent as the constituent indicated on FIG. 1

A tread portion 11 of a pneumatic tire 2 illustrated in FIG. 3 is formed from a rubber material (tread rubber), the same as for Basic Mode 1 illustrated in FIG. 1, and is exposed on the outermost side in the tire radial direction of the pneumatic tire 2, and the surface thereof forms the profile of the pneumatic tire 2. The surface of the tread portion 11 forms a tread surface 13 constituting the surface that contacts the road surface when a vehicle (not illustrated) upon which the pneumatic tire 2 is mounted is traveling.

In the example illustrated in FIG. 3 also, rows of small blocks are formed in both the tire width direction and the tire circumferential direction by the plurality of circumferential narrow grooves 16, 16' and the plurality of width direction narrow grooves 20 (for example, 20a, 20b, 20c) that intersect with these circumferential narrow grooves 16, 16'.

Under this assumption, in the present embodiment also (Basic Mode 2), the circumferential narrow grooves 16, 16' are disposed with a density in the tire width direction of not less than 0.06 grooves/mm, and not more than 0.2 grooves/mm, and the width direction narrow grooves 20 extend at an angle with respect to the tire width direction of not less than −45° and not more than 45°. Also, the circumferential narrow grooves 16, 16' have at least one bent portion, and the bend angle θ in this bent portion is not less than 40° and not more than 160°.

As described above, the pneumatic tire according to Basic Mode 2 also provides an improvement in the density in the tire width direction of the circumferential narrow grooves and the angle at which the tire width direction narrow grooves are disposed, and in addition assuming that bent portions are provided in the circumferential narrow grooves, provides an improvement in the bend angle of the bent portions. As a result, according to the pneumatic tire of the present embodiment, the braking performance and the turning performance on ice are improved in particular.

Additional Embodiments

Next, descriptions are made of Additional Embodiments 1 to 10 which can be optionally implemented as opposed to Basic Embodiment of the pneumatic tire according to the present technology described above.

Additional Embodiment 1

In the Basic Mode (Basic Modes 1 and 2), preferably the spacing between width direction narrow grooves 20 in either FIG. 1 or 3 is not less than 0.8 times and not more than 1.5 times the spacing between circumferential narrow grooves 16 (16') (Additional Embodiment 1).

Here, the spacing between width direction narrow grooves 20 is, for example, the distance between center lines in the groove width direction of the width direction narrow grooves 20a, 20b that are adjacent to each other in the tire circumferential direction (or the width direction narrow grooves 20b, 20c that are adjacent to each other in the tire circumferential direction). Likewise, the spacing between circumferential narrow grooves 16 (16') is the distance between center lines in the groove width direction of the circumferential narrow grooves 16 (16') that are adjacent to each other in the tire width direction. Note that the center lines in the groove width direction are lines that pass through the center point of the groove measured in a direction perpendicular to the direction of extension of the groove.

By making the spacing between width direction narrow grooves 20 not less than 0.8 times the spacing between circumferential narrow grooves 16 (16'), the length in the tire circumferential direction of the small blocks B1 (B2) can be prevented from being excessively small with respect to the length in the tire width direction. In this way, collapsing of the small blocks B1 (B2) in the tire circumferential direction can be minimized, sufficient resistance with respect to external forces in the tire circumferential direction can be ensured, and the braking performance on ice can be increased.

Also, by making the spacing between the width direction narrow grooves 20 not more than 1.5 times the spacing between the circumferential narrow grooves 16 (16'), the length in the tire width direction of the small blocks B1 (B2) can be prevented from being excessively small with respect to the length in the tire circumferential direction. In this way, collapsing of the small blocks B1 (B2) in the tire width direction can be minimized, sufficient resistance with respect to external forces in the tire width direction can be ensured, and the turning performance on ice can be increased.

(Additional Mode 2)

In the Basic Modes and the Basic Modes to which the Additional Embodiment 1 has been added, preferably the groove width of the circumferential narrow grooves 16 (16') in both FIGS. 1 and 3 is not less than 1.0 mm and not more than 4.0 mm (Additional Mode 2). Here, the groove width of the circumferential narrow grooves 16 (16') is the groove dimension measured in a direction perpendicular to the direction of extension of the circumferential narrow grooves 16 (16').

By making the groove width of the circumferential narrow grooves 16 (16') not less than 1.0 mm, excellent drainage performance on ice can be realized. Also, by making the groove width not more than 4.0 mm, the small blocks B (B1, B2) that are partitioned and formed by the grooves 16 (16') contact each other and support each other when an external force in the tire width direction or an external force in the tire circumferential direction is applied. In this way, collapse in the tire width direction and collapse in the tire circumferential direction of the small blocks B is minimized, and it is possible to increase both the turning performance and the braking performance on ice.

(Additional Mode 3)

In the Basic Modes and the Basic Modes to which at least either of Additional Mode 1 or 2 is added, preferably the groove width of the width direction narrow grooves 20 in either of FIG. 1 or 3 is not less than 1.0 mm and not more than 4.0 mm (Additional Mode 3). Here, the width of the width direction narrow grooves 20 is the groove dimension measured in a direction normal to the direction of extension of the width direction narrow grooves 20.

By making the groove width of the width direction narrow groove 20 not less than 1.0 mm, excellent water drainage performance on ice can be realized. Also, by making the groove width not more than 4.0 mm, the small blocks B (B1, B2) partitioned and formed by these grooves 20 contact each other and support each other when an external force is applied in the tire circumferential direction in particular. In this way, the collapse of the small blocks B in the tire circumferential direction is minimized, and the braking performance on ice can be further increased.

Additional Embodiment 4

In the Basic Modes and the Basic Modes to which at least any of Additional Embodiments 1 to 3 is added, preferably small blocks that are adjacent to each other in the tire width direction in either of FIG. 1 or 3 each include a region that is the same in the tire width direction (Additional Mode 4).

Figure 4A:
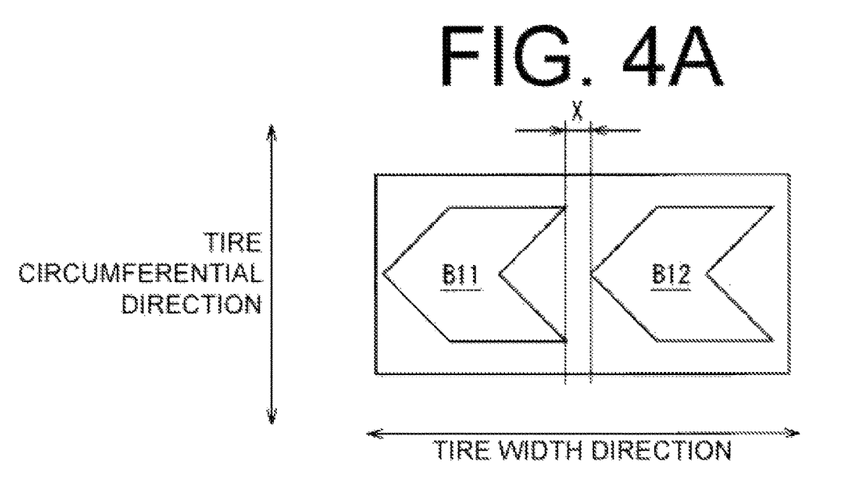
Figure 4B:
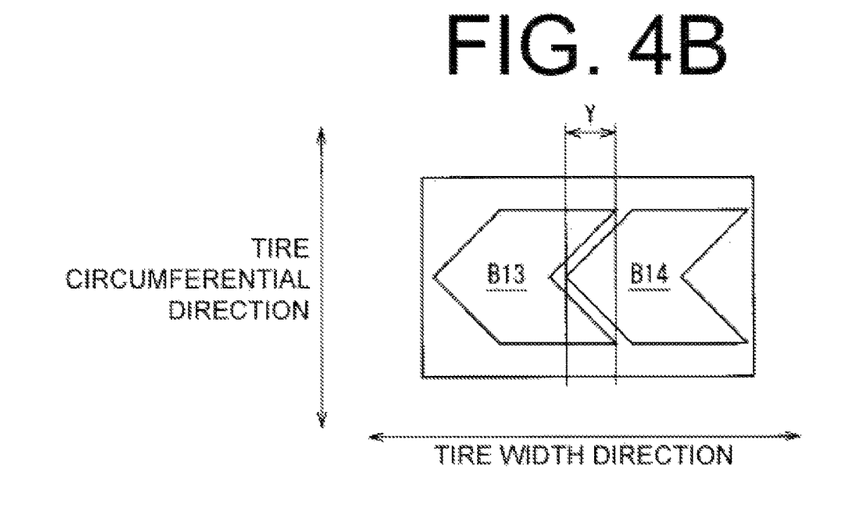

FIGS. 4A and 4B are plan views illustrating the relationship between small blocks B1 that are adjacent to each other in the tire width direction in the pneumatic tires illustrated in FIG. 1 or 3. FIG. 4A illustrates a case in which the small blocks do not have a region that is the same in the tire width direction, and FIG. 4B illustrates a case in which the small blocks have a region that is the same in the tire width direction. In these drawings, the regions other than the small blocks B1 (B11, B12, B13, B14) indicate the regions of grooves that partition and form the small blocks B1.

In the example illustrated in FIG. 4A, in the region in the tire width direction between the back edge portion of the chevron shaped small block B11 that has anisotropy in the tire width direction and the tip portion of the chevron shaped small block B12 having anisotropy in the tire width direction (the region extending in the tire circumferential direction indicated by the line X in the tire width direction), there is only a groove. In other words, in the example illustrated in FIG. 4A, the small blocks B11, B12 do not have a region that is the same in the tire width direction.

In contrast, in the example illustrated in FIG. 4B, in the region in the tire width direction between the back edge portion of the chevron shaped small block B13 that has anisotropy in the tire width direction and the tip portion of the chevron shaped small block B14 having anisotropy in the tire width direction (the region extending in the tire circumferential direction indicated by the line Y in the tire width direction), there is a portion of the small blocks B13, B14. In other words, in the example illustrated in FIG. 4B, the small blocks B13, B14 have a region that is the same in the tire width direction.

In the present embodiment (Additional Embodiment 4), the form indicated in FIG. 4B is envisaged. In the example illustrated in this drawing, the dimension in the tire width direction of the groove interposed between the small blocks B13, B14 is small compared with that of the example illustrated in FIG. 4A. Therefore, when an external force in the tire width direction is applied to the small blocks B13, B14, the small blocks B13, B14 contact each other and support each other in the region Y. In this way, collapsing in the tire width direction of the small blocks B13, B14 can be further minimized, and the turning performance on ice can be further increased.

Likewise, in the example illustrated in FIG. 4B, the dimension in the tire circumferential direction of the groove interposed between the small blocks B13, B14 is small compared with the example illustrated in FIG. 4A. Therefore, when an external force in the tire width direction is applied to the small blocks B13, B14, the small blocks B13, B14 support each other in the region Y. In this way, collapsing in the tire width direction of the small blocks B13, B14 can be further minimized, and the braking performance on ice can be further increased.

Additional Embodiment 5

In Basic Mode 1 and Basic Mode 1 to which at least any of Additional Embodiments 1 to 4 is added, which are pneumatic tires with a designated vehicle mounting direction, preferably at least in the region on the vehicle mounting outer side from the tire equatorial plane CL in FIG. 1, there is no apex of a bent portion that bends to the vehicle mounting outer side on the width direction narrow grooves 20 (Additional Embodiment 5).

In order to effectively improve the turning performance on ice in the pneumatic tire illustrated in FIG. 1, it is effective for the small blocks B1 to have more anisotropy in the tire width direction in the vehicle mounting outer side region from the tire equatorial plane CL than the vehicle mounting inner side region from the tire equatorial plane CL. In view of this knowledge, in the present embodiment, in at least the vehicle mounting outer side region from the tire equatorial plane CL, there is no apex of the bent portions that bend to the vehicle mounting outer side on the width direction narrow grooves 20, and as a result the chevron tip portions of the small blocks B1 all face towards the vehicle mounting outer side. In this way, in the vehicle mounting outer side region from the tire equatorial plane CL, the resistance is further increased with respect to external forces from the vehicle mounting outer side towards the vehicle mounting inner side in particular, from among the external forces in the tire width direction. As a result, collapsing of the small blocks B1 towards the vehicle mounting inner side is minimized, and the turning performance on ice can be further increased.

Note that preferably there are no apexes of the bent portions that bend towards the vehicle mounting outer side on the width direction narrow grooves 20 in the vehicle mounting inner side region from the tire equatorial plane CL also, and not just in the vehicle mounting outer side region from the tire equatorial plane CL. In this case, the resistance with respect to external forces from the vehicle mounting outer side towards the vehicle mounting inner side is further increased on both sides in the tire width direction of the tire equatorial plane CL. As a result, collapsing towards the vehicle mounting inner side is minimized for all the small blocks B1 illustrated in FIG. 1, and the turning performance on ice can be still further increased.

Additional Embodiment 6

In Basic Mode 2 and Basic Mode 2 to which at least any of Additional Embodiments 1 to 4 is added, which are pneumatic tires that do not have a designated vehicle mounting direction, preferably there are no apexes of the bent portions that bend to the opposite side to the tire equatorial plane CL on the width direction narrow grooves 20 (Additional Embodiment 6) in FIG. 3.

In order to effectively improve the turning performance on ice in the pneumatic tire illustrated in FIG. 3, it is effective to provide more anisotropy in the tire width direction in the small blocks B1 (B2) in the actual vehicle mounting outer side region from the tire equatorial plane CL than in the actual vehicle mounting inner side region from the tire equatorial plane CL. However, the pneumatic tire illustrated in this drawing does not have a designated vehicle mounting direction, so there is a possibility that either side in the tire width direction from the tire equatorial plane CL could be on the actual vehicle mounting outer side. Also, in the pneumatic tire according to the present embodiment, the tread pattern on both sides in the tire width direction of the tire equatorial plane CL is symmetrical with respect to the tire equatorial plane CL (line symmetry or point symmetry), so if the tread pattern on one side in the tire width direction of the tire equatorial plane CL is determined, the tread pattern on the other side is also determined. Therefore, in the pneumatic tire illustrated in FIG. 3, in order to effectively improve the turning performance on ice, it is sufficient to simply provide anisotropy in the tire width direction in the small blocks B1 (B2). In view of this knowledge, in the present embodiment, there are no apexes of the bent portions that bend to the opposite side to the tire equatorial plane CL on the width direction narrow grooves 20, and as a result the chevron tip portions of the small blocks B1 (B2) can all be oriented to the actual vehicle mounting outer side. In this way, in the actual vehicle mounting outer side region from the tire equatorial plane CL, the resistance is further increased with respect to external forces from the vehicle mounting outer side towards the vehicle mounting inner side in particular, from among the external forces in the tire width direction. As a result, in the actual vehicle mounting outer side region from the tire equatorial plane CL, collapsing of the small blocks B1 (B2) towards the vehicle mounting inner side can be minimized, and the turning performance on ice can be further increased.

Additional Embodiment 7

In Basic Mode 1 and Basic Mode 1 to which at least any of Additional Embodiments 1 to 5 is added, which are pneumatic tires with a designated vehicle mounting direction, preferably the spacing between circumferential narrow grooves 16 becomes narrower from the vehicle mounting inner side towards the outer side (Additional Embodiment 7).

Figure 5:
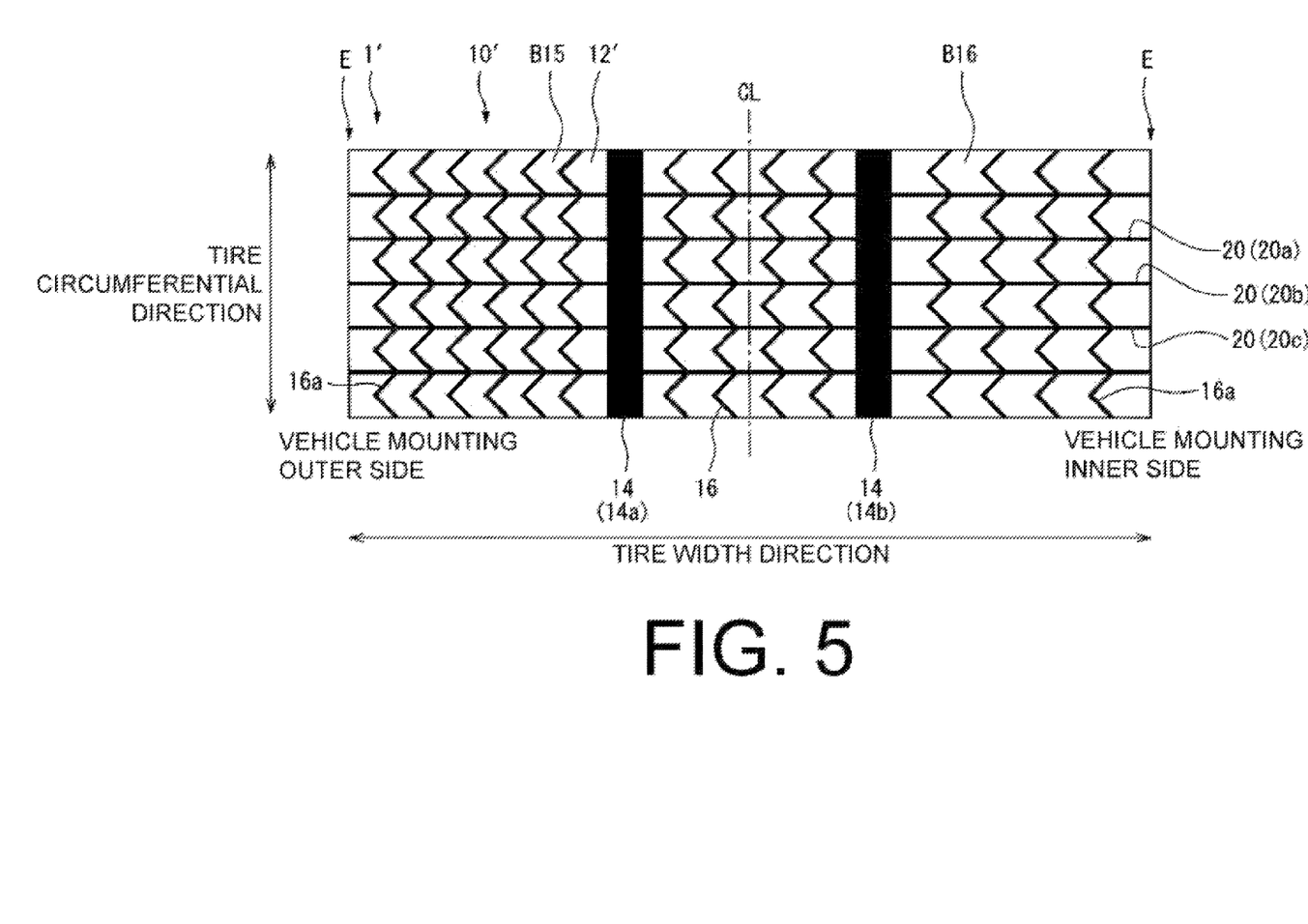
FIG. 5 is a plan view illustrating a preferred example of the tread portion illustrated in FIG. 1.

FIG. 5 is a plan view illustrating a preferred example of the tread portion 10 illustrated in FIG. 1. The example illustrated in FIG. 5 is an example relating to a tread surface 12' of a tread portion 10' of the pneumatic tire F. Reference symbols in FIG. 5 that are the same as reference symbols in FIG. 1 indicate that the constituent is the same as the constituent indicated in FIG. 1. The example illustrated in FIG. 5 has a designated vehicle mounting direction. Among the region on the outer side in the tire width direction of the circumferential main groove 14a (vehicle mounting outer side region), the region between the circumferential main grooves 14a, 14b (region near the tire equatorial plane), and the region on the outer side in the tire width direction of the circumferential main groove 14b (vehicle mounting inner side region), the spacing between circumferential narrow grooves 16 is narrowest in the vehicle mounting outer side region, and the spacing between circumferential narrow grooves 16 is narrowest in the vehicle mounting inner side region.

In this way, in the vehicle mounting outer side region, the group of small blocks that includes a plurality of small blocks B15 has many edges with large tire width direction component and tire circumferential direction component. As a result, the resistance with respect to external forces in the tire width direction and the resistance with respect to external forces in the tire circumferential direction are both further increased, and therefore the turning performance and the braking performance on ice can both be further increased.

Also, if a camber angle (negative camber) is applied, the vehicle mounting inner side region becomes the more heavily loaded region than the vehicle mounting outer side region so it can easily wear, and it is possible to extend the life as a result of this wear by increasing the spacing between circumferential narrow grooves 16 and increasing the dimension of the small blocks B16, thereby providing greater ground contact area.

Note that in the example illustrated in FIG. 5, the spacing between circumferential narrow grooves 16 is the same in each of the regions: the vehicle mounting outer side region, the region near the tire equatorial plane, and the vehicle mounting inner side region. However, preferably the spacing between circumferential narrow grooves 16 becomes gradually narrower towards the outer side from the vehicle mounting inner side in each of these regions also. In this case, it is possible to gradually change the turning performance and braking performance on ice effect in the vehicle mounting outer side, and the effect of extending the life due to the wear on the vehicle mounting inner side as described above in the tire width direction. Therefore, both of these effects can be distributed in a well-balanced manner in all regions in the tire width direction.

Additional Embodiment 8

In Basic Mode 2 and Basic Mode 2 to which at least any of Additional Embodiments 1 to 4 and 6 are added, which are pneumatic tires that do not have a designated vehicle mounting direction, preferably the spacing between circumferential narrow grooves 16 (16') becomes narrower to the outer side in the tire width direction from the tire equatorial plane CL (Additional Embodiment 8).

Figure 6:
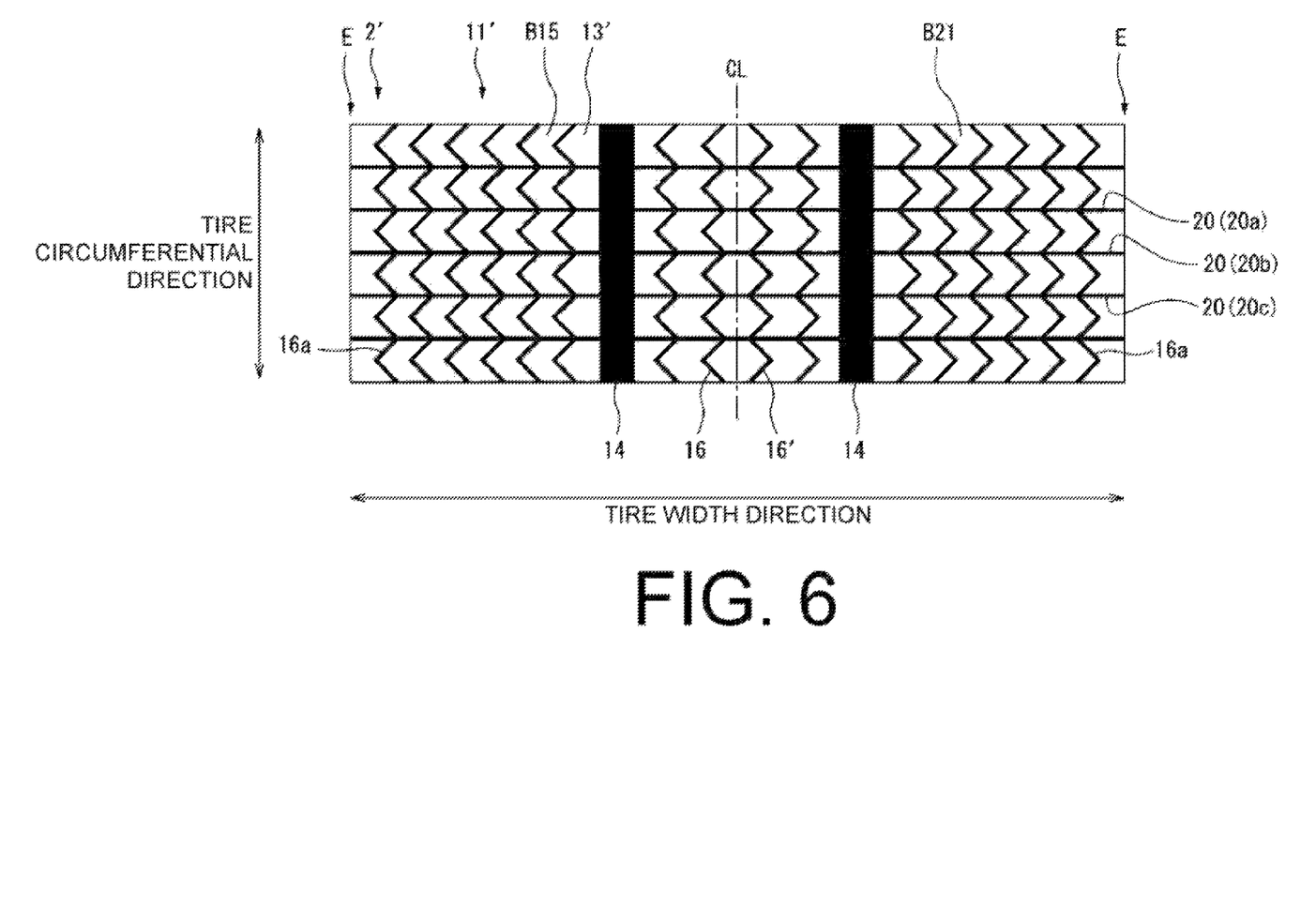
FIG. 6 is a plan view illustrating a preferred example of the tread portion illustrated in FIG. 3.

FIG. 6 is a plan view illustrating a preferred example of the tread portion 11 illustrated in FIG. 3. The example illustrated in FIG. 6 is an example relating to a tread surface 13' of a tread portion 11' of the pneumatic tire 2'. Reference symbols in FIG. 6 that are the same as reference symbols in FIG. 3 indicate that the constituent is the same as the constituent indicated in FIG. 3. The example illustrated in FIG. 6 does not have a designated vehicle mounting direction. The spacing between circumferential narrow grooves 16 (16') is narrower in each of the regions on the outer side in the tire width direction of the circumferential main grooves 14, 14 on both sides in the tire width direction (tire width direction outer side regions) than in the region between the circumferential main grooves 14, 14 (tire width direction inner side region).

In this way, in the outer side in the vehicle width direction region, the groups of small blocks that includes a plurality of small blocks B15, B21 have many edges with large tire width direction component and tire circumferential direction component. As a result, the resistance with respect to external forces in the tire width direction and the resistance with respect to external forces in the tire circumferential direction are both further increased, and therefore the turning performance and the braking performance on ice can both be further increased.

Also, on the inner side in the tire width direction region, the spacing between circumferential narrow grooves 16 (16') is wider, so the dimensions of the small blocks are larger compared with those of the outer side in the tire width direction region, and therefore a large ground contact area can be ensured, and the steering stability performance can be increased.

Note that in the example illustrated in FIG. 6, the spacing between circumferential narrow grooves 16 (16') are all the same within each region: the outer side in the tire width direction regions and the inner side in the tire width direction region. However, preferably the spacing between circumferential narrow grooves 16 (16') gradually narrows towards the outer side in the tire width direction from the tire equatorial plane CL within each of these regions also. In this case, it is possible to gradually change the turning performance and braking performance on ice effect in the outer side in the tire width direction region, and the effect of improving the steering stability performance in the inner side in the tire width direction region as described above, in the tire width direction. Therefore, both of these effects can be distributed in a well-balanced manner in all regions in the tire width direction.

Additional Embodiment 9

In the Basic Modes and the Basic Modes to which at least any of Additional Embodiments 1 to 8 have been added, preferably at least one sipe is formed in the small blocks B1 (B2, B15, B16, B21) in FIGS. 1, 3, 5, 6

Additional Embodiment 9

By forming at least one sipe in the small blocks B1 (B2, B15, B16, B21), more edges can be provided in the groups of small blocks that includes the small blocks. In this way, when the edges include a large tire circumferential direction component as a result of forming the sipes, the resistance with respect to external forces in the tire width direction is further increased, and the turning performance on ice can be greatly increased. Also, when the edges include a large tire width direction component as a result of forming the sipes, the resistance with respect to external forces in the tire circumferential direction is further increased, so the braking performance on ice can be greatly increased.

Additional Embodiment 10

In the Basic Modes and the Basic Modes to which at least any of Additional Embodiments 1 to 9 have been added, preferably the apexes of the bent portions are in the 50% center portion of the tire circumferential direction region of the bent portion in FIGS. 1, 3, 5, 6 (Additional Embodiment 10).

Here, focusing on a single bent portion as illustrated in FIG. 2, the 50% center portion of the tire circumferential direction region of the bent portion refers to the region RC in the 50% center portion in the tire circumferential direction within the tire circumferential direction region R from one end portion of the bent portion to the end portion at the other side in the tire circumferential direction.

In FIG. 2, by providing the apex A of the bent portion in the region RC, it is possible to minimize an excessive difference between the magnitude of the edge component in the tire circumferential direction and the magnitude of the edge component in the tire width direction, in the edge formed by the groove component from the apex A on one side in the tire circumferential direction and the edge formed by the groove portion on the other side, that are formed extending in the same small block. In this way, the difference in resistance with respect to external forces in the tire width direction due to these two edges, and, the difference in resistance with respect to external forces in the tire circumferential direction due to these two edges can be minimized. As a result, collapsing of the small blocks B1 in the tire width direction and collapsing in the tire circumferential direction can be minimized in a well-balanced manner on both sides in the tire circumferential direction from the apex A, so both the turning performance and braking performance on ice can be further increased.

EXAMPLES

Pneumatic tires according to Working Example 1 to Working Example 10 were manufactured to tire size 205/55R16, having one of the tread patterns illustrated in FIG. 1, 3, 5, or 6, and in accordance with the various conditions shown in Table 1 (density in the tire width direction of circumferential narrow grooves (circumferential narrow groove density), extension angle of the width direction narrow grooves with respect to the tire width direction (width direction narrow groove extension angle), bend angle of the bent portions (bend angle), ratio of spacing between width direction narrow grooves and spacing between circumferential narrow grooves (spacing ratio), groove width of circumferential narrow grooves, groove width of width direction narrow grooves, whether or not small blocks that are adjacent to each other in the tire width direction have a region that is the same in the tire width direction (present in same region in tire width direction), whether or not at least one sipe is formed in small blocks (presence/absence of sipes), and whether or not the apex of the bent portions are in the 50% center portion region (specified region) of the bent portion tire circumferential direction region (bent portion region)). Note that the examples illustrated in FIGS. 1 and 5 are examples in which the vehicle mounting direction is designated, and the examples illustrated in FIGS. 3 and 6 are examples in which the vehicle mounting direction is not designated. Also, the examples illustrated in FIGS. 1 and 3 are examples in which the spacing between circumferential narrow grooves 16 is constant from the vehicle mounting inner side to the outer side. The examples illustrated in FIGS. 5 and 6 are examples in which the spacing between circumferential narrow grooves 16 becomes narrower from the vehicle mounting inner side towards the outer side.

In contrast, a pneumatic tire according to a Conventional Example was manufactured to a tire size 205/55R16, having a tread pattern that is the same as the tread pattern of Working Example 1 except that the circumferential narrow grooves did not have bent portions but extended in the tire circumferential direction in a linear manner.

Each of the test tires, Working Example 1 to Working Example 10 and the Conventional Example, was fitted to a 16×6.5 J rim and inflated to an air pressure of 230 kPa, fitted to a sedan vehicle with an engine displacement of 1800 cc, and sensory evaluation of braking performance on ice and turning performance on ice was carried out by test drivers. The results are shown on Table 1.

(Braking Performance on Ice)

On an icy road surface, the braking distance was measured from traveling at a speed of 40 km/h, and index evaluation was carried out with the Conventional Example as standard (100). With this evaluation, a larger index value indicates superior braking performance on ice.

(Turning Performance on Ice)

Turning about a radius of 30 m was carried out on an icy road surface, and the average revolution time was measured, the inverse of the measured value was calculated, and index evaluation was carried out with the Conventional Example as standard (100). With this evaluation, a larger index value indicates superior turning performance on ice.

TABLE 1

|  | Conventional Example | Working Example 1 | Working Example 2 | Working Example 3 | Working Example 4 | Working Example 5 |
|---|---|---|---|---|---|---|
| Tread pattern | — | FIG. 1 | FIG. 1 | FIG. 1 | FIG. 1 | FIG. 1 |
| Circumferential narrow groove density [grooves/mm] | 0.1 | 0.1 | 0.1 | 0.1 | 0.1 | 0.1 |
| Width direction narrow groove extension angle [°] | 0 | 0 | 0 | 0 | 0 | 0 |
| Bend angle [°] | — | 100 | 100 | 100 | 100 | 100 |
| Spacing ratio [times] | 0.7 | 0.9 | 1.0 | 1.0 | 1.0 | 1.0 |
| Groove width of circumferential narrow grooves [mm] | 0.9 | 0.9 | 0.9 | 2.0 | 2.0 | 2.0 |
| Groove width of width direction narrow grooves [mm] | 0.9 | 0.9 | 0.9 | 0.9 | 2.0 | 2.0 |

TABLE 1-continued

|  |  |  |  |  |  |  |
|---|---|---|---|---|---|---|
| Present in same region in tire width direction | None | None | None | None | None | Present |
| Presence/absence of sipes | None | None | None | None | None | None |
| Bent portion region | — | Outside specified region | Outside specified region | Outside specified region | Outside specified region | Outside specified region |
| Braking performance on ice | 100 | 100 | 100 | 103 | 104 | 106 |
| Turning performance on ice | 100 | 103 | 105 | 105 | 105 | 110 |

|  | Working Example 6 | Working Example 7 | Working Example 8 | Working Example 9 | Working Example 10 |
|---|---|---|---|---|---|
| Tread pattern | FIG. 1 | FIG. 1 | FIG. 3 | FIG. 5 | FIG. 6 |
| Circumferential narrow groove density [grooves/mm] | 0.1 | 0.1 | 0.1 | Note 1 below | Note 2 below |
| Width direction narrow groove extension angle [°] | 0 | 0 | 0 | 0 | 0 |
| Bend angle [°] | 100 | 100 | 100 | 100 | 100 |
| Spacing ratio [times] | 1.0 | 1.0 | 1.0 | 1.0 | 1.0 |
| Groove width of circumferential narrow grooves [mm] | 2.0 | 2.0 | 2.0 | 2.0 | 2.0 |
| Groove width of width direction narrow grooves [mm] | 2.0 | 2.0 | 2.0 | 2.0 | 2.0 |
| Present in same region in tire width direction | Present | Present | Present | Present | Present |
| Presence/absence of sipes | Present | Present | Present | Present | Present |
| Bent portion region | Outside specified region | Within specified region | Within specified region | Within specified region | Within specified region |
| Braking performance on ice | 110 | 110 | 110 | 115 | 110 |
| Turning performance on ice | 110 | 115 | 115 | 120 | 120 |

Note 1:
As indicated in FIG. 5, in the vehicle mounting outer side region 0.12 grooves/mm, in the region near the tire equatorial plane 0.10 grooves/mm, and in the vehicle mounting inner side region 0.08 grooves/mm Note 2:
As indicated in FIG. 6, in the tire width direction outer side regions 0.10 grooves/mm, and in the tire width direction inner side region 0.08 grooves/mm From Table 1 it can be seen that for Working Example 1 to Working Example 10 that are within the technical scope of the present technology (improvements with respect to density of disposal of circumferential narrow grooves in the tire width direction, extension angle of the tire width direction narrow grooves, and bend angle of the bent portions), in all cases the braking performance and the turning performance on ice was higher than that of the pneumatic tire according to the Conventional Example, which was not within the technical scope of the present technology.

What is claimed is:

1. A pneumatic tire, comprising:
a circumferential main groove; and
rows of small blocks partitioned and formed by a plurality of width direction narrow grooves and a plurality of circumferential narrow grooves that intersect with the width direction narrow grooves;
the circumferential narrow grooves being disposed with a density in a tire width direction of not less than 0.06 grooves/mm, and not more than 0.2 grooves/mm;
the width direction narrow grooves extending at an angle with respect to the tire width direction of not less than −45° and not more than +45°;
the circumferential narrow grooves having at least one bent portion; and
a bend angle of the bent portion being not less than 40° and not more than 160°;
wherein in at least a region in a tire mounting outer side from a tire equatorial plane, there is no apex of the at least one bent portion that bends towards a vehicle mounting outer side on the width direction narrow grooves.

2. The pneumatic tire according to claim 1, wherein a spacing between the width direction narrow grooves is not less than 0.8 times and not more than 1.5 times a spacing between the circumferential narrow grooves.

3. The pneumatic tire according to claim 2, wherein a groove width of the circumferential narrow grooves is not less than 1.0 mm and not more than 4.0 mm.

4. The pneumatic tire according to claim 3, wherein a groove width of the width direction narrow grooves is not less than 1.0 mm and not more than 4.0 mm.

5. The pneumatic tire according to claim 4, wherein the small blocks that are adjacent to each other in the tire width direction have a region that is the same in the tire width direction.

6. The pneumatic tire according to claim 5, wherein the spacing between circumferential narrow grooves becomes narrower from a vehicle mounting inner side towards an outer side.

7. The pneumatic tire according to claim 5, wherein the spacing between circumferential narrow grooves becomes narrower from a tire equatorial plane towards a tire width direction outer side.

8. The pneumatic tire according to claim 7, wherein at least one sipe is formed in the small blocks.

9. The pneumatic tire according to claim 5, wherein there is no apex of the at least one bent portion that bends to an opposite side to a tire equatorial plane on the width direction narrow grooves.

10. The pneumatic tire according to claim 1, wherein a groove width of the circumferential narrow grooves is not less than 1.0 mm and not more than 4.0 mm.

11. The pneumatic tire according to claim 1, wherein a groove width of the width direction narrow grooves is not less than 1.0 mm and not more than 4.0 mm.

12. The pneumatic tire according to claim 1, wherein the small blocks that are adjacent to each other in the tire width direction have a region that is the same in the tire width direction.

13. The pneumatic tire according to claim 1, wherein there is no apex of the at least one bent portion that bends to an opposite side to a tire equatorial plane on the width direction narrow grooves.

14. The pneumatic tire according to claim 1, wherein spacing between circumferential narrow grooves becomes narrower from a vehicle mounting inner side towards an outer side.

15. The pneumatic tire according to claim 1, wherein spacing between circumferential narrow grooves becomes narrower from a tire equatorial plane towards a tire width direction outer side.

16. The pneumatic tire according to claim 1, wherein at least one sipe is formed in the small blocks.

17. The pneumatic tire according to claim 1, wherein the circumferential main groove comprises a plurality of circumferential main grooves and one of the rows of small blocks is centered on a tire equator.

18. The pneumatic tire according to claim 1, wherein the circumferential narrow grooves are disposed with a density in a tire width direction of not less than 0.07 grooves/mm, and not more than 0.2 grooves/mm.

19. A pneumatic tire, comprising:
a circumferential main groove; and
rows of small blocks partitioned and formed by a plurality of width direction narrow grooves and a plurality of circumferential narrow grooves that intersect with the width direction narrow grooves;
the circumferential narrow grooves being disposed with a density in a tire width direction of not less than 0.06 grooves/mm, and not more than 0.2 grooves/mm;
the width direction narrow grooves extending at an angle with respect to the tire width direction of not less than −45° and not more than +45°;
the circumferential narrow grooves having at least one bent portion; and
a bend angle of the bent portion being not less than 40° and not more than 160°;
wherein there is no apex of the at least one bent portion that bends to an opposite side to a tire equatorial plane on the width direction narrow grooves.

* * * * *